United States Patent [19]

Telle

[11] 4,149,761
[45] Apr. 17, 1979

[54] WATER LUBRICATED STAVE BEARING
[75] Inventor: Byron J. Telle, Middlefield, Ohio
[73] Assignee: The Johnson Rubber Company, Middlefield, Ohio
[21] Appl. No.: 657,061
[22] Filed: Feb. 11, 1976
[51] Int. Cl.² ............................................. F16C 27/06
[52] U.S. Cl. ..................................................... 308/238
[58] Field of Search ................. 308/237, DIG. 12, 78, 308/238

[56] References Cited
U.S. PATENT DOCUMENTS

| | | | |
|---|---|---|---|
| 3,606,505 | 9/1971 | Satterthwaite | 308/238 |
| 3,746,414 | 7/1973 | Sudyk et al. | 308/238 |
| 3,826,547 | 7/1974 | Finefrock | 308/238 |

Primary Examiner—Richard A. Bertsch
Attorney, Agent, or Firm—McNenny, Pearne, Gordon, Gail, Dickinson & Schiller

[57] ABSTRACT

A water lubricated rubber bearing is disclosed in which a compliment of staves is positioned within a bearing housing having a cylindrical inner bearing housing surface. When unstressed, the stave can be moved within the housing for installation or removal. Locking of the staves in the assembly is provided by producing tight frictional contact between the inner bearing housing surface and the exterior surface of the staves. Such locking frictional contact is produced by axially compressing the staves to increase their thickness and to produce tight frictional contact between the outer surface of the stave with the bearing housing along the entire length of the staves. Additional locking is provided at the ends of the staves by pins mounted on the housing assembly, which project into bores within the ends of the staves. Such pins augment the frictional locking at the ends of the staves to resist peripherally directed movement of the stave ends. Each stave illustrated consists of two aligned and abutting stave elements providing cylindrical openings at their ends, which receive bridging alignment pins to insure that the stave elements are aligned in the assembled condition.

1 Claim, 4 Drawing Figures

WATER LUBRICATED STAVE BEARING

BACKGROUND OF THE INVENTION

This invention relates generally to water lubricated rubber bearings, and more particularly to a stave bearing of such type incorporating novel and improved means for releasably mounting the staves within the bearing housing.

PRIOR ART

In the U.S. Pat. Nos. to Satterthwaite et al, 3,407,779 and 3,606,505 (licensed to the assignee of the present invention) water lubricated rubber stave bearings are disclosed in which staves are releasably locked within a bearing housing by clamping means which produce tight frictional engagement between the outer stave surfaces and the inner surface of the bearing housing. In the latter of these patents, a structure is disclosed in which the staves are mounted in the bearing housing by axially compressing the staves to cause them to laterally thicken into tight frictional engagement with the inside of the housing. Such frictional engagement is utilized in such bearings to provide the entire locking of the staves within the bearing housing. Removal of such staves is accomplished by release of the clamping means to allow axial removal and replacement of the staves.

Such systems for releasably locking staves generally function in a very satisfactory manner. However, in some instances in use, the staves have slipped in a peripheral direction within the housing with the result that the staves assumed a spiral position within the housing. Apparently, such slippage occurs at one or both ends and the central stave sections remain locked in their assembled location.

In some instances, it is believed that the slippage of the staves has resulted from improper stave installation which has produced bearing seizure. However, in some instances, the slippage may have resulted from the higher bearing loading which occurs at the ends of the bearing because of high lateral shaft loading. For example, in a ship's propulsion system, the weight of the propeller or propellers inbalance caused by propeller damage can produce non-uniform bearing loading.

In another United States Patent issued to Sudyk et al, U.S. Pat. No. 3,746,414 (assigned to the assignee of the present invention) a structure is disclosed in which rods extend the length of the staves and removably lock the staves within the bearing housing. All of these patents are incorporated by reference.

SUMMARY OF THE INVENTION

In accordance with one preferred embodiment of this invention, a stave locking system is provided in which the staves are clamped to provide tight frictional contact or engagement between the staves and the inner wall of the bearing housing. Such frictional engagement exists along the entire length of the stave. However, in accordance with the present invention, additional stave locking is provided at the ends of the staves to insure that the stave ends do not slip within the housing.

With such structure, the principal locking is provided by the clamping of the staves and such clamping exists along the entire stave length. Such clamp locking is augmented at the ends of the staves to insure that slippage does not occur, even when the bearing loading on the ends is substantially greater than the bearing loading intermediate its ends.

In the illustrated embodiment the ends of the staves are provided with axially extending bores which receive pins mounted on a compression head at one end and the reaction shoulder at the other end. These pins function to mechanically lock the stave ends against peripherally directed movement within the bearing housing. The compression heads are also arranged to axially compress the staves to provide the frictional locking of the staves within the bearing housing along the entire length of each of the staves.

In accordance with another aspect of this invention, a structure is provided to interconnect the adjacent ends of stave elements in bearings where two or more stave elements are aligned and abutting within the bearing so that the staves need not be as long as the bearing. In such systems, it is important to insure proper alignment between the adjacent abutting ends of the stave elements to insure that the water grooves or the like are properly aligned and provide proper lubrication. In such bearings, the abutting ends of the staves are provided with aligned recesses or bores and pins extending into such bores bridged between the adjacent abutting ends and lock the abutting ends in proper position with respect to each other.

These and other aspects of the invention are more fully described in the following description and drawings.

DETAILED DESCRIPTION OF THE DRAWINGS

Figure 1:
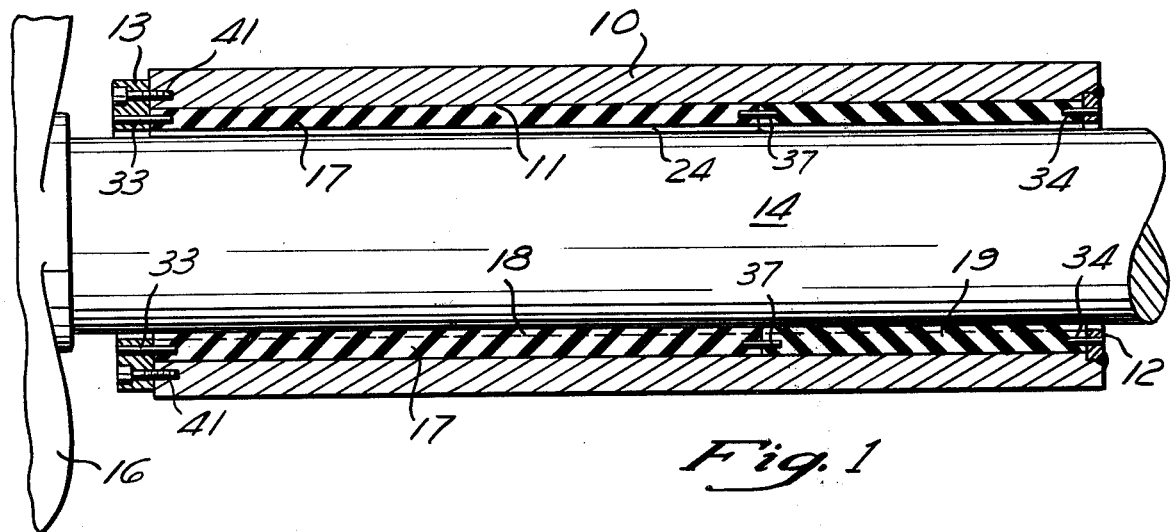
FIG. 1 is a side elevation in longitudinal section of a water lubricated stave bearing incorporating the present invention.

FIG. 1 is a simplified view of a water lubricated rubber stave bearing of the type which may be used in a ship to support the propulsion shaft adjacent to the propeller. It should be recognized that the structural arrangement is simplified in the drawings and that in a typical installation, struts or the like may be provided to connect the bearing housing to the hull structure. The illustrated bearing includes a bearing housing 10 providing a cylindrical inner housing surface or wall 11, which is uninterrupted and does not provide key ways or dovetail structures to lock the staves within the housing. Welded to one end of the housing 10 is a reaction shoulder 12 and releasably bolted to the other end of the housing is a two-piece compression head 13. A cylindrical shaft 14 extends through the housing and supports a propeller 16 at its end.

Mounted within the housing 10 between the compression head 13 and the reaction shoulder 12 are a plurality of elongated staves 17, formed entirely of elastomeric material. Each of the staves 17, in the illustrated embodiment, consists of two axially aligned and abutting stave elements 18 and 19, having a similar cross section best illustrated in FIG. 2.

Figure 2:
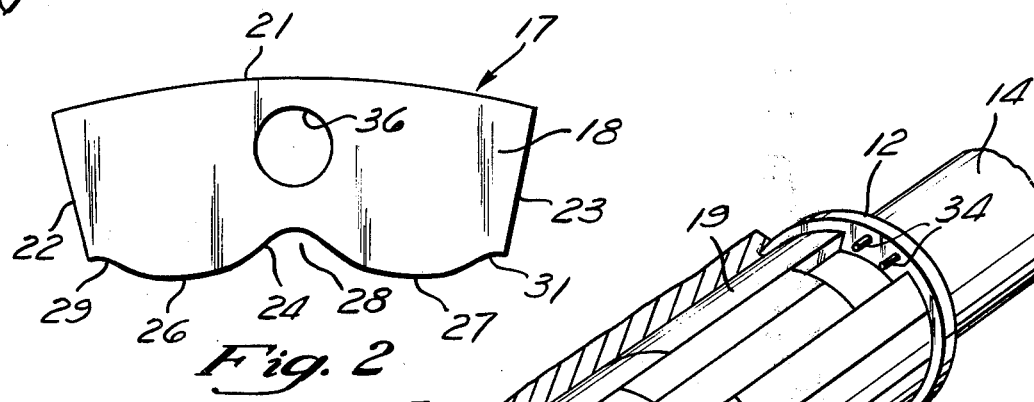
FIG. 2 is an enlarged end view of one of the staves of the bearing of FIG. 1.

Referring to FIG. 2, each stave provides an outer surface or wall 21, which is a segment of a cylinder opposite lateral edges 22 and 23, which extend from the outer surface 21 to the inner stave surface 24. The inner stave surface 24 is formed with a curved configuration providing two bearing surfaces 26 and 27, a central water groove 28 and two partial water grooves 29 and 31. When a full compliment of staves is assembled within the bearing housing, the partial water groove of one stave cooperates with the partial water groove of the next adjacent stave to provide water grooves having a shape substantially the same as the central water grooves 28. Also, in the assembled compliment, the side faces or edges 22 and 23 abut adjacent edges of adjacent staves along planes which are substantially radial with respect to the bearing assembly.

In the illustrated embodiment, the two stave elements 18 and 19 have an unstressed length greater than the installed length and are proportioned so that in the full compliment sufficient clearance exists to allow movement of the staves within the housing when they are unstressed. After a compliment of staves is installed within the housing around the shaft 14, the compression head 13 is installed and functions to axially compress the staves, causing them to laterally expand into tight engagement with the inner surface 11 of the housing to lock the staves in their installed position. Such locking action is produced by the tight frictional engagement between the staves and the inner housing surface 11 and exists along the entire length of the installed staves. In the installed position, when the staves are fully locked by the axial clamping action of the compression head 13, sufficient clearance exists between the staves and the shaft 14 to prevent bearing seizure and to provide proper lubrication when water flows along the water grooves between each of the bearing surfaces 26 and 27.

Additional positive mechanical locking is provided at each end of the staves 17 by pins 33 and 34, which are mounted in the compression head 13 and the reaction shoulder 12, respectively. These pins project into end bores 36 formed at the ends of the staves 17 and provide positive mechanical stops or locking structure, to augment the frictional locking of the staves at the ends of the staves. In addition, pin 37 bridge between the abutting ends of the stave elements 18 and 19 and extend into the adjacent bores 36 to insure proper alignment of the stave elements to insure that the water grooves are properly aligned for full lubrication. In practice, it is desirable to form the stave elements 18 and 19 with blind bores at each end which are all the same size and depth and to utilize pins of the same diameter so that special assembly positions are not required.

Figure 3:
FIG. 3 is an exploded perspective view illustrating the bearing of FIG. 1 partially assembled; and, FIG. 4 is an enlarged fragmentary perspective view illustrating the structure for connecting abutting aligned stave elements.
Figure 4:
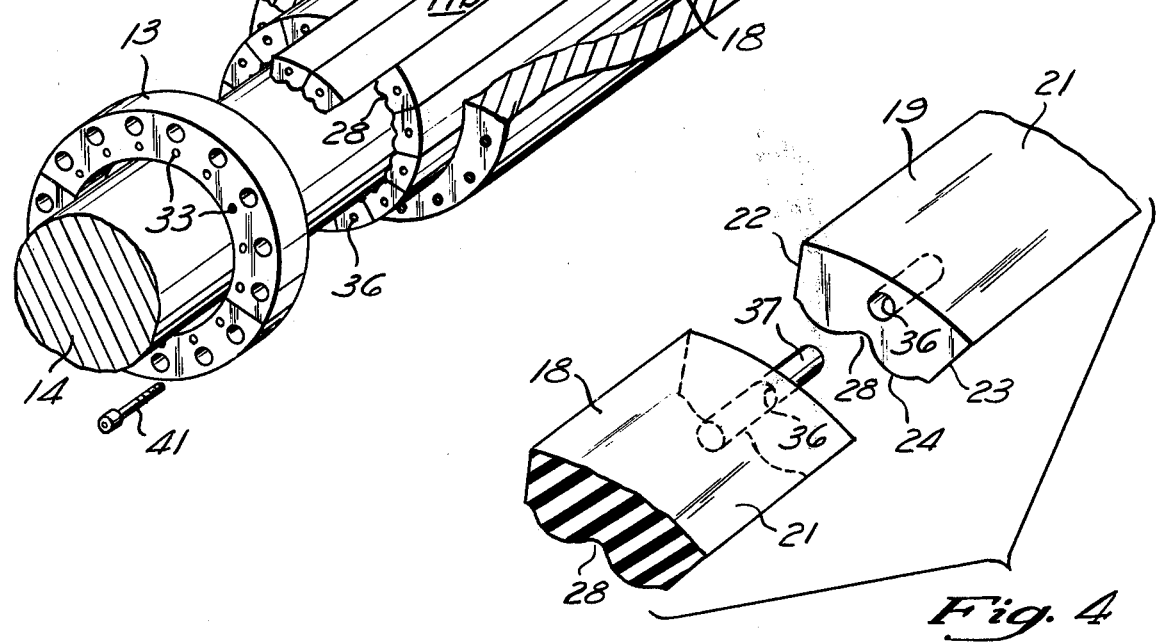

FIG. 3 illustrates the bearing in a partially assembled condition in which all of the staves 17, excepting the staves 17a and 17b, are fully inserted and seat at one end against the reaction shoulder 12. The staves 17a and 17b are illustrated in a partially assembled position in which their ends are spaced from the reaction shoulder 12. After all of the staves are fully inserted, the compression head 13 is installed and pulled up by bolts 41, which extend through the compression head and are threaded into the end of the housing 10. As the bolts 41 are tightened, the compression head is pulled in against the end face of the housing causing the staves 17 to be axially compressed and producing lateral expansion of the staves to cause the locking engagement between the outer surfaces 21 of the staves and the inner surface 11 of the housing 10. In practice, the compression head 13 is usually formed of two or more segments so that it can be assembled or disassembled from around the shaft 14.

When it is desired to disassemble the bearing for replacement of worn or damaged staves, the compression head is removed releasing the compression locking of the staves and the staves can be pulled axially out of the bearing housing. Also, when the compression locking is released and when the staves are pulled axially along the housing, a sufficient distance to clear the pins 34, the staves can be moved peripherally along the housing.

With the present invention, the staves are locked throughout their length by tight frictional engagement between the outer stave surfaces and the inner surface of the housing. Such locking, however, is augmented at the ends of the staves by the pins 33 and 34. Therefore, the staves are securely locked against movement within the housing, even when the installation is such that non-uniform bearing loading is provided along the length of the bearing. Such non-uniform loading can result, for example, from the weight of the propeller 16, or for other reasons, such as eccentric loadings or inbalance in the supported system. Further, in accordance with the present invention, it is possible to insure correct alignment of staves formed of two or more aligned and abutting stave elements.

Although a preferred embodiment of this invention is illustrated, it is to be understood that various modifications and rearrangements may be resorted to without departing from the scope of the invention disclosed and claimed.

What is claimed is:

1. A bearing assembly adapted to support a shaft comprising a housing providing a cylindrical inner wall, a plurality of segmental staves formed entirely of elastomeric material providing inner bearing surfaces cooperating to provide a bearing for a cylindrical shaft, the exterior of said staves providing an outer surface cooperating when installed in said housing to define a mating wall mating with said inner wall, releasable clamping means axially compressing said staves producing lateral thickening thereof and tight frictional contact between said outer wall of said staves and said inner wall along substantially the entire length of said staves for locking said staves in said housing with frictional locking which is substantially uniform along the entire length of said staves, said clamping means including a compression head removably engaging the adjacent ends of said staves, and means to move said compression head axially relative to said housing to axially compress said staves, release of said clamping means releasing said tight frictional contact and allowing relative movement between said staves and said housing, and mechanical stop means releasably locking only the ends of said staves against peripheral movement within said housing, said mechanical stop means including cylindrical projections having a length substantially less than the length of said staves on said compression head which fit into cylindrical recesses in the ends of said staves, and similar mechanical stop means at the end of said staves remote from said compression head, said frictional contact augmenting the locking of said ends of said staves by said mechanical stop means and providing substantially the entire locking of said staves within said housing intemediate their end, the locking of said slaves against peripherally directed movement being substantially greater at the ends thereof than intermediate the ends thereof, each stave including at least two aligned and abutting stave elements of similar cross section, each stave element being provided with a cylindrical opening at its abutting end, and aligning pins extending into said cylindrical openings to maintain said abutting ends in alignment.

* * * * *